United States Patent [19]
Flanagan, Jr.

[11] 3,808,726
[45] May 7, 1974

[54] SPINNER LURE RIG

[76] Inventor: Lindley E. Flanagan, Jr., 5700 Rockhill Rd., Fort Worth, Tex. 76112

[22] Filed: July 24, 1972

[21] Appl. No.: 274,431

[52] U.S. Cl. .............................................. 43/42.13
[51] Int. Cl. ........................................... A01k 91/00
[58] Field of Search............ 43/42.13, 42.11, 42.08, 43/42.03, 42.15, 42.16, 42.17, 42.47, 43.1, 44.97, 42.37, 42.11

[56] References Cited
UNITED STATES PATENTS

| | | | |
|---|---|---|---|
| 3,253,363 | 5/1966 | Steehn .............................. | 43/42.13 |
| 3,241,261 | 3/1966 | Ament .............................. | 43/42.03 |
| 3,020,668 | 2/1962 | O'Neil .............................. | 43/42.16 |
| 3,550,304 | 12/1970 | Kuslich ............................ | 43/42.47 |

*Primary Examiner*—Robert Peshock
*Assistant Examiner*—Gregory E. McNeill
*Attorney, Agent, or Firm*—James M. Cate

[57] ABSTRACT

A spinner lure rig includes both a sub-surface lure portion and a hydrofoil structure which, in use, rides on the surface of the water in hydroplane fashion for supporting the rig in the water. A yoke is connected between the sub-surface lure and the hydrofoil structure for positioning the lure at a predetermined depth beneath the water surface when the hydrofoil structure is on the surface. Alternatively, the rig may be worked below the water surface. In a preferred embodiment, the hydrofoil structure is configured with dihedral, hydrofoil wing portions which enhance the stability of the hydrofoil during forward movement. The preferred embodiment of the rig is also configured with at least most of the area of the hydrofoil located to the rear of the center of gravity of the entire rig, whereby the rig is adopted to glide forwardly through the water when permitted to sink.

6 Claims, 5 Drawing Figures

PATENTED MAY 7 1974 3,808,726

SPINNER LURE RIG

This invention relates to fishing lures and, more particularly, to fishing lures of the spinner type.

Spinner lures of various types are widely used in both fresh and salt water fishing and are highly favored by many experienced fishermen. Typical spinner lures include at least one spinner element adapted to rotate about a shaft or bearing element when the lure is drawn through the water, the spinner element usually having a bright, metallic finish for causing the spinner element to emit periodic flashes of light in the water as it rotates. Spinner lures of the type known as "spinner baits" also include a non-buoyant body or "head" portion configured to resemble a small fish or insect. A flexible skirt, typically of strands of plastic or the like, is normally affixed to a rear portion of the body and positioned to partially conceal the hook, which is attached at the rear of the body.

The rotatable vanes or spinner elements of spinner lures are believed to enhance the effectiveness of such lures primarily for two reasons. First, the bright, pulsating reflections of light from the spinner elements exert a strong attraction to fish which view the lures. The visual effect closely resembles the appearance of light reflected from the body of a small fish swimming through the water. This attraction is of particular effectiveness in the case of game fish which feed upon smaller fish and which seek and intercept the small fish by means primarily of sight rather than smell. Moreover, fishermen are sometimes surprised to discover that spinner lures are also effective when their appearance is apparently not an important factor, e.g., when the lures are fished in muddy water or on heavily overcast days. The reason for this latter effect is believed to be that the rapidly spinning vanes of the lures create turbulences within the water which cause underwater sound waves, or pressure variations, to be conducted through the water from the lure. These pressure variations apparently simulate underwater sound waves caused by small fish as their tails and fins undulate and move rapidly back and forth during swimming, such vibrations being sensed by larger fish and acting to stimulate them and cause them to swim about rapidly seeking the source of the vibrations. Thus, the effectiveness and popularity of the various types of spinner lures can be readily appreciated.

In the past, however, such lures have suffered from several limitations. It is often sought to fish a lure at the surface of the water to attract bass and other surface-feeding fish. In one method of use termed "buzzing," the lure is drawn through the water while the rod is directed upwardly at an almost vertical position so that the lure will be drawn upwardly by the line and caused to skim along the water surface. The spinner element can thereby be made to rotate at the water surface, causing increased noise and disturbance in the water. To achieve this result, however, the fishermen is required to retrieve the lure at a relatively rapid rate. Additionally, since spinner lures are normally of the sub-surface type, they are subject to become snagged upon hidden, submerged objects in spite of care on the part of the fisherman to avoid such objects and in spite of the snag minimizing design of many of the spinner lures. Again, the fisherman is required to retrieve the lure rapidly, with the rod tip elevated high above the water surface, if the lure is to be kept close to the surface so that snags may be avoided. Such rapid movement through the water is not generally desirable, however, because the fish may not have sufficient time to observe the lure and strike. Indeed, at least one authority recommends that spinner lures be retrieved at as slow a rate as possible for maximum effectiveness (McClane's Standard Fishing Encyclopedia; Holt, Rinehart & Winston, 1965, page 831). In any case, it is known that many experienced fishermen prefer to vary the speed at which a lure is retrieved occasionally from fast to slow, and this has been impossible with existing spinner lures.

An analogous problem is that if the lure is cast for a considerable distance or trolled a distance behind a boat, it becomes even more difficult to control the depth of the lure because the line is substantially horizontal and cannot transmit upwardly directive forces to the lure. The fisherman who wishes to retrieve a lure on or close to the surface of the water is thus restricted to fairly short casts and must retrieve the lure rapidly; the lure is therefore worked for only a short period of time after each cast and passes through the water in an unnatural manner because of its great speed.

If it is desired to retrieve the lure below the surface, other problems exist. In working a conventional spinner lure below the water surface, the lure is permitted to sink for a few moments after the cast to permit the lure to attain a preferred, initial depth. Such spinner lures sink fairly rapidly until the line is rewound, and an inexperienced fisherman may not be able to judge accurately the correct, initial waiting period in which the lure will sink to a preferred depth. As the lure is then brought in, it follows the line, moving through the water along an upwardly sloped path toward the raised tip of the rod. It will be apparent that, while the fisherman may prefer to fish the lure at a particular depth for given conditions, the lure passes through the preferred region only during a portion of its path when retrieved. It will also be appreciated by those skilled in the art that such use of a spinner lure below the surface of the water greatly increases the likelihood of the lure becoming snagged, particularly during the period when the lure is permitted to sink to a desired depth after the cast.

Summarizing, the fisherman is restricted in his use of sub-surface spinner lures by the relatively limited distance through which they can be effectively retrieved, by their tendency to sink rapidly and become snagged if retrieving of the lures is delayed after casting, and by the requirement that the lures by retrieved at a high rate of speed if it is desired to work the lures close to the water surface, e.g., to simulate a shallow swimming minnow tor to minimize the likelihood of snags. It can be readily understood from the above discussion that the successful use of such spinner lures requires a rather great amount of skill on the part of the fisherman; inexperienced fishermen may become discouraged because of the above-cited difficulties and may thus be prevented from obtaining the benefits which such lures can provide. It would obviously be a great advance in the art to provide a spinner lure which could be conveniently fished at a relatively slow speed at the water surface and which did not require the fisherman to retrieve the lure in an upward path through the water after initially permitting the lure to sink when the lure is to be retrieved below the surface.

It is, therefore, a major object of the present invention to provide a new and improved spinner lure rig.

A further object is to provide a spinner rig which may be retrieved effectively at a lower rate of speed, at any depth, than conventional spinner lures.

A related object is to provide such a spinner rig which, if retrieved at a rate of speed above a predetermined, minimum rate, will move adjacent to the water surface, with one portion of the lure above the surface and another portion below the surface.

A still further object is to provide such a lure wherein a rotatable spinner element is positioned adjacent the upper lure element and is adapted to pass through the water surface, during rotation, when the lure is retrieved adjacent the surface.

A still further object is to provide such a lure rig which is adapted to glide forwardly through the water if permitted to sink, simulating a wounded fish.

Yet another object is to provide a spinner lure rig which, in use, resembles two small fish swimming one above the other.

A further, major object is to provide such a lure rig in which the upper portion thereof is adapted to skim along the surface of the water for supporting the lure and for creating additional disturbance of the water surface.

A final object is to provide such a spinner lure rig which is suited for use by inexperienced fishermen because of its ability to follow the water surface even when cast a great distance over the water or trolled a great distance behind a boat and because of its relatively slow rate of descent when permitted to sink.

Figure 1:
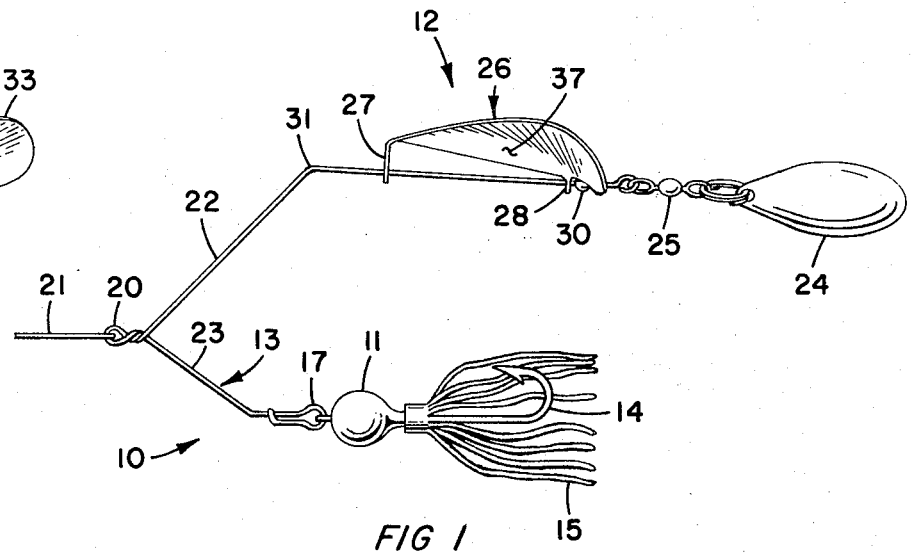
FIG. 1 is a side elevation of a preferred embodiment of the spinner lure rig.

With reference now to FIG. 1, a preferred embodiment of the spinner lure rig 10 includes a sub-surface lure 11, a hydrofoil structure 12 adapted, as will be explained hereinbelow, to skim or hydroplane on the surface of a body of water during use, and a yoke structure 13 connected between the hydrofoil structure and the sub-surface lure.

Figure 2:
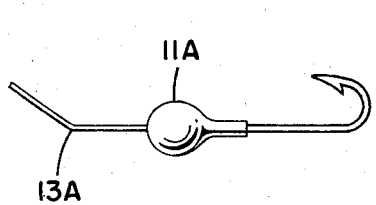
FIG. 2 is a side elevation of an alternative embodiment of the lure portion of the rig.

The sub-surface lure 11 preferably has the configuration of a small fish or other food object, and it is colored or marked in a manner suited for the particular fishing conditions for which it is intended, according to the general practices of the art. The lure 11 is of heavier-than-water construction and is suitably of lead, and it comprises a major portion of the mass of the entire rig 10. When the rig 10 is cast into the water, the relatively heavy and compact lure 11 initially sinks at a faster rate than the hydrofoil structure 12 and thus tends to keep the rig 10 in an upright position, with the hydrofoil structure 12 positioned above the lure 11, as shown in FIG. 1. A hook 14 is attached to and extends rearwardly from the rear end of the lure 11 and has its arcuate portion projecting upwardly, for the purpose of minimizing snags as the rig 10 passes over submerged objects during use below the water surface. A flexible skirt 15, suitably of multi-colored, plastic streamers or the like, is attached to the rear of the lure 11 in close proximity to the hook 14 and is configured in such a manner that it partially conceals the hook 14 during use, in the manner of skirts used for conventional lures of the spinner bait type. The lure 11 is affixed to the lower, distal end of the yoke 13 by a connecting means 16 which permits the lure 11 to be replaced if, for example, it is desired to employ a lure of another color. The connecting means 16, for example, is a loop projecting from the top or front of the lure 11. The loop 16 connects with a loop 17 formed in the lower end portion of the yoke 13 and lying in a plane perpendicular to a plane through the loop 16 in such a manner that the lure 11 is constrained from rolling, or rotating about its longitudinal axis, relative to the yoke. The arcuate portion of the hook 14 thus remains in an upwardly projecting orientation. In an alternative embodiment shown in FIG. 2, the lure 11A is rigidly affixed to the yoke 13A.

Referring again primarily to FIG. 1, the yoke 13 is suitably of stainless steel wire and is of approximately V-shaped configuration, the apex thus formed comprising the forward end of the yoke, in use. A connector or connecting means 20, suitably a loop formed in the wire yoke 13, is provided at the apex of the yoke, the connector 20 having an aperture for conveniently receiving a fishing line 21. A first or upper portion 22 of the yoke 13 extends upwardly and rearwardly from the connector 20 to the hydrofoil structure 12 when the rig 10 is in an upright position, and a second or lower portion 23 extends diagonally downwardly and rearwardly from the connector 20 to the lure 11, the connecting loop 17 to which the lure 11 is attached thus comprising a loop formed on the distal or lower end of the lower portion 23 of the yoke 13.

At least one spinner element or blade 24 is rotatably connected to the yoke 13, the spinner element 24 being preferably connected to the rear or distal end of the upper yoke portion 22 by means of a swivel connector 25 connected to the yoke immediately rearwardly of the hydrofoil structure 12. When the hydrofoil 12 is on the water surface, the yoke 13 extends below the water surface for a distance of several inches; the yoke 13, however, is of a size which may be conveniently handled and cast.

Figure 4:
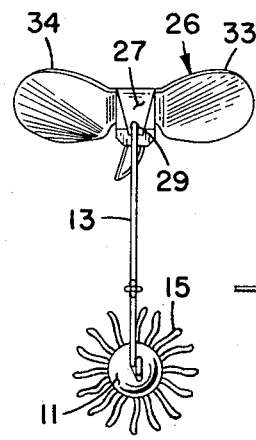
FIG. 4 is a front view of the spinner lure rig of FIGS. 1 and 3.
Figure 3:
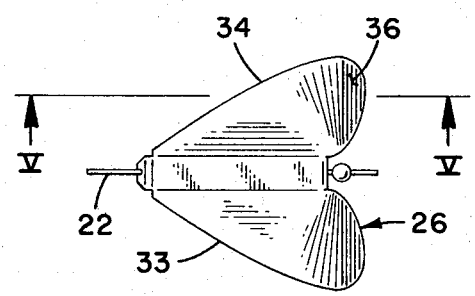
FIG. 3 is a top, plan view of the hydrofoil structure of the spinner lure rig of FIG. 1.

With respect now to the hydrofoil structure 12 itself and with additional reference to FIGS. 3–4, the hydrofoil 12 may be of various types, but in its preferred form suitably comprises a dihedral wing structure 26 formed of a single sheet of a plastic or metal material. Aluminum sheet, of a thickness of approximately 0.025 inches, is satisfactory. The hydrofoil structure may be conveniently made by conventional stamping processes, if made of metal, or molding processes if made of plastic. The wing structure 26, in plan, is of delta wing configuration approximating an isosceles triangle, and is mounted on the yoke 13 adjacent the rear end of the upper yoke portion 22 by means of depending, downwardly projecting, front and rear tabs 27, 28, each of which has a small aperture 29 (FIG. 4) adjacent its distal end for receiving the wire yoke 23. The front tab 27 is located adjacent the forward apex of the triangular wing structure 26, and the rear tab 28 is positioned at the center of the rear or base side of the generally triangular wing structure. The upper portion 22 of the yoke 13 is passed loosely through the apertures 29 of the front and rear tabs 27, 28 and a bead 30 (FIG. 1)

is loosely mounted on the upper yoke portion 22 immediately to the rear of the rear tab 28 for providing a bearing surface against which the hydrofoil structure 12 seats rotatably during use.

The relative lengths of the tabs 27, 28 are chosen such that when the rig 10 is in an upright position as occurs during forward motion through the water, the wing structure 26, when the rig is viewed in longitudinal cross-section, has a positive angle of attack. Additionally, the upper portion 22 of the yoke 13 is preferably bent, at a location 31 forward of the hydrofoil 12, to further increase the angle of attack.

The dihedral wing structure 26 includes symmetrical left and right wing portions 33, 34 extending leftwardly and rightwardly from the central rib portion extending between the tabs 27, 28. The wing portions 33, 34 each are inclined at a dihedral angle of approximately 20°–30°.

Figure 5:
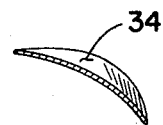
FIG. 5 is a cross-sectional view taken on the line V—V of FIG. 3.

The two wing portions 33, 34 of the dihedral wing structure 26 are preferable cambered from front to rear, or such that their upper surfaces 36 are convex and their lower surfaces 37 are concave. Additionally, the trailing edges of the wing portions 33, 34, which may be conveniently extended somewhat rearwardly of the rear tab 28, are deflected downwardly toward the rear to further increase the lift provided by the hydrofoil structure 12 during forward motion thereof, as shown most clearly in FIG. 5.

In an alternative embodiment (not shown) the rear portion of the lower surface 37 of the wing structure 26 is aligned with or directed toward the lure skirt 15, whereby currents of water are directed toward the skirt 15 by the wing structure 26 for causing the skirt to undulate rapidly in the water during forward movement of the rig 10.

In operation, the spinner lure rig 10 is initially cast over the water or trolled behind a boat in the same manner as a conventional lure. Upon landing in the water after a cast, the rig 10 rights itself because of the previously discussed, stabilizing effect of the low center of gravity provided by the relatively heavy, sub-surface lure 11 mounted on the lower portion of the yoke 13. The rig 10 then begins to sink, but does so at a much slower rate than conventional spinner lures because of the resistance to downward movement provided by the hydrofoil structure 12, which acts somewhat analogously to a parachute in the atmosphere. In the preferred embodiment in which the center of gravity of the lure rig 10 is forward of most of the lifting area of the hydrofoil 12, the forward end of the lure rig 10 is then directed at a downward angle in the water, and the rig 10 glides forwardly and downwardly in the water while the line 21 remains slack, or until the fisherman begins to rewind the line to retrieve the rig 10. During this forward, gliding motion of rig 10, the spinner blade 24 is made to spin by the flow of water past it. This initial forward and inclined, diving movement of the rig 10 is a unique and advantageous feature, in that it presents the lure attractively to fish as it sinks by simulating the motion of a wounded minnow or the like, and has been found to be quite effective in attracting fish. Additionally, during the forward inclined motion, the lure portion 11 is maintained in an upright position such that the hook is less likely to snag on an underwater obstruction. Conventional spinner-bait lures, lacking the unique hydrofoil, sink directly downward without any forward motion, and thus are less attractive to game fish and more likely to snag. For example, because the initial downward movement of the rig 10 is much slower than that of conventional spinner lures, the rig 10 is less likely to become snagged upon submerged objects or vegetation before the fishermen can begin to retrieve the rig; the rig is thus less likely to become entangled, and possibly lost, by an inexperienced fisherman.

As the lure rig 10 is then retrieved it assumes its upright position, and the dihedral wing structure 26 exerts an upward force on the rig 10 because of its positive angle of attack. The forwardly directive force exerted on the rig through the line 21 also tends to minimize yaw and pitch and thus acts to keep the rig in its upright position. If the rig 10 is retrieved at a quite slow rate, the upward force exerted by the wing structure 26 is not sufficient to bring the rig to the water surface, and the rig rises to an equilibrium position and then progresses forwardly at a fairly constant depth below the water surface. Increasing the speed of the rig 10 increases the lift and causes the rig to rise to a position closer to the surface; by experimentation, the fisherman can learn to control the depth at will. Thus, the rig 10 is adapted for use as a sub-surface lure, with its depth being dependent upon the rate of speed at which it is retrieved. Because its depth remains relatively constant throughout the retrieval, moreover, the rig 10 has several advantages when compared with conventional spinner lures without hydrofoil structures for permitting such depth control. As was discussed initially, conventional spinner lures are retrieved along an upwardly sloped path, since lift must be provided by the inclined fishing line attached to the raised tip of the fishing rod. In contrast, the present lure rig 10, by traveling in a substantially horizontal path, can be retrieved entirely within a desired region of depth in the water and is thus potentially effective during all of its course rather than merely in that portion of its course in which it passes through the preferred region as it travels upwardly toward the rod tip. During all forward underwater travel, the spinner 24 is caused to rotate, and the rig 10 thus achieves the advantages of conventional spinner lures without their major disadvantages.

If the rate of speed of the rig 10 is increased sufficiently to bring the hydrofoil structure 12 to the water surface, the wing structure 26 will begin to skim or plane along the water surface in hydroplane fashion. Hydroplaning is achieved by the dihedral wing 26 because of its positive angle of attack and because of the front to rear camber of the wing whereby the rear portions of the lower surface 37 are sloped increasingly downwardly toward the rear. In the hydroplaning or surface-riding mode of operation, the hydrofoil structure 12 creates additional turbulence on the water surface, which is an additional attraction to game fish which feed on the surface. Additionally, the spinner element 24, because it is connected to the upper yoke portion 22 adjacent the hydrofoil structure, is positioned sufficiently adjacent the water surface to permit it to break through the surface during rotation and thus produce the advantages of such an effect discussed earlier with respect to the practice termed "buzzing" employed with conventional spinner lures. The dihedral configuration of the wing structure 26 tends to stabilize the wing structure as it skims over or passes through waves or irregularities in the water surface, and the pivotal mounting provided by the two tabs 27, 28 rotatable about the yoke upper portion 22 permits the wing structure 26 to easily rotate back and forth if necessary as it passes over irregularities in the water surface, while the remaining portions of the rig 10 remain relatively stable. This pivotal action is thus effective to prolong the life of the rig 10 by minimizing the stresses received by the rig during operation.

A further advantage of the lure rig 10 is that it can be fished effectively through a wide and varying range of depths during a single retrieve. Since it glides downward along an inclined path, with the spinner blade spinning, when the fishing line is slack, and rises rapidly to the surface when retrieved, the fisherman can alternately cause the rig to glide to the bottom of the lake or river, then rise to the surface, then glide to the bottom again, then rise, etc., during a single retrieve, thereby increasing the likelihood of getting a strike regardless of the depth location of the fish.

A further advantage of the rig 10 is derived from the appearance of the hydrofoil structure 12 on the surface as it is observed from below. Because of its generally elongated shape, the appearance of the hydrofoil structure 12 approximates the appearance of a small fish swimming on the surface. Moreover, the hydrofoil structure 12 and lure 11, positioned one above the other, give the appearance of two small fish swimming one above the other; this is thought to enhance the attractiveness of the rig 10 in the water, in that game fish are more likely to feed upon schools of small fish than upon a single fish swimming alone.

Because of the hydroplaning effect provided by the dihedral wing structure 26 when the rig 10 is operated at the water surface, the rig 10 is maintained at the surface primarily by the lift provided by the wing 26 rather than by the upward force exerted by the fisherman's line as was previously the case when spinner lures were retrieved on the surface. Therefore, the difficulties initially outlined concerning the use of conventional spinner lures at the surface are alleviated. That is, the rig 10 can be drawn through the water on the surface at a much slower rate, increasing both its effectiveness and the length of time it remains in the water after each cast. Moreover, because its surface-riding action does not depend upon the upward angle of the line, the rig 10 may be cast over the water for relatively great distances and brought immediately to the surface, where it will ride effectively throughout the retrieve. It should be noted that once the initial, minimum speed at which hydroplaning occurs is reached, the rig 10 remains at the surface even when the speed is varied considerably, thus providing increased versatility.

Thus, in both surface and sub-surface use, the lure rig 10 is easily controlled and is therefore well-suited for use by even inexperienced anglers. Its surface-riding characteristic and its slow rate of descent along an inclined path when the fishing line is slack, along with the snag preventing position of its hook, previously mentioned, all serve to minimize the problems of snags which have been a major disadvantage of spinner lures in the past.

While only two embodiments of the invention, together with modifications thereof, have been described in detail herein and shown in the accompanying drawing, it will be evident that various further modifications are possible in the arrangement and construction of its components without departing from the scope of the invention.

What is claimed is:

1. A spinner lure rig comprising:
   a sub-surface lure;
   a hydrofoil structure comprising means adapted to skim over the surface of a body of water for supporting the spinner lure rig in the water;
   a yoke structure having a first portion connected to the hydrofoil structure and a second portion connected to the sub-surface lure and having connecting means for receiving a fishing line, the first portion extending upwardly from the connecting means to the hydrofoil structure and the second portion extending downwardly from the connecting means to the sub-surface lure when the rig is in an upright position; and
   at least one spinner element rotatably connected to the yoke structure.

2. The apparatus of claim 1, wherein more than half of the surface area of the hydrofoil structure is positioned to the rear of the center of gravity of the spinner lure rig and wherein the hydrofoil structure additionally comprises means causing the spinner lure rig to glide forwardly and downwardly through the water when the lure is permitted to sink.

3. The apparatus of claim 1, wherein the hydrofoil structure comprises a dihedral wing structure of delta wing configuration in plan, the wing structure having left and right, dihedral wing portions of substantially triangular configuration.

4. The apparatus of claim 3, wherein the dihedral wing structure is cambered from front to rear and wherein the rear portion of the lower surface of the dihedral wing structure is inclined downwardly from front to rear.

5. The apparatus of claim 3, wherein the first portion of the yoke structure extends beneath the dihedral wing structure and wherein the hydrofoil wing structure is provided with front and rear pivotal connecting means for pivotally connecting the hydrofoil wing structure to the first portion of the yoke and for permitting pivotal movement of the dihedral wing structure about an axis through the front and rear pivotal connecting means.

6. The apparatus of claim 3, wherein the at least one spinner element is rotatably connected to the first portion of the yoke structure at a location thereon spaced rearwardly from the dihedral wing structure.

* * * * *